US011940173B2

United States Patent
Zhang et al.

(10) Patent No.: US 11,940,173 B2
(45) Date of Patent: Mar. 26, 2024

(54) HEAT EXCHANGE DEVICE

(71) Applicant: PANASONIC ECOLOGY SYSTEMS GUANGDONG CO., LTD, Guangdong (CN)

(72) Inventors: Jun Zhang, Guangdong (CN); Zhenhong Yang, Guangdong (CN); Shiyan Guan, Guangdong (CN)

(73) Assignee: Panasonic Ecology Systems Guangdong Co., LTD (CN)

( * ) Notice: Subject to any disclaimer, the term of this patent is extended or adjusted under 35 U.S.C. 154(b) by 293 days.

(21) Appl. No.: 17/394,036

(22) Filed: Aug. 4, 2021

(65) Prior Publication Data

US 2022/0170664 A1 Jun. 2, 2022

(30) Foreign Application Priority Data

Nov. 30, 2020 (CN) .......................... 202011375316.0

(51) Int. Cl.
 *F24F 13/20* (2006.01)
(52) U.S. Cl.
 CPC .................................... *F24F 13/20* (2013.01)
(58) Field of Classification Search
 CPC .. F24F 13/20; F24F 12/006; F24F 7/08; F24F 11/89; F24F 13/02; Y02B 30/56
 USPC .......................................................... 165/47
 See application file for complete search history.

(56) References Cited

U.S. PATENT DOCUMENTS

| 2005/0103464 | A1* | 5/2005 | Taylor | F24F 12/006 165/4 |
| 2006/0252363 | A1* | 11/2006 | Charlebois | F24F 13/20 454/188 |
| 2019/0128556 | A1* | 5/2019 | Grinbergs | F24F 11/41 |

* cited by examiner

Primary Examiner — Steve S Tanenbaum
(74) Attorney, Agent, or Firm — Mendelsohn Dunleavy, P.C.

(57) ABSTRACT

The present application provides a heat exchange device. The heat exchange device includes: a case, an interior of which is formed into an air-supply inflow space, an exhaust inflow space, an air-supply outflow space and an exhaust outflow space separated from each other, wherein a first extension wall is provided between the air-supply inflow space and the exhaust outflow space; and a heat exchange unit disposed in the case, and the air-supply inflow space and the air-supply outflow space communicate with each other by the heat exchange unit to form an air-supply air path, and the exhaust inflow space and the exhaust outflow space communicate with each other by the heat exchange unit to form an exhaust air path, wherein the air-supply air path and the exhaust air path exchange heat when passing through the heat exchange unit; the first extension wall is provided with a circulation air port communicating the air-supply inflow space and the exhaust outflow space, wherein the circulation air port may be selectively opened and closed. The heat exchange device may not only provide indoor air circulation but also ensure heat exchange efficiency.

20 Claims, 7 Drawing Sheets

HEAT EXCHANGE DEVICE

CROSS-REFERENCE TO RELATED APPLICATION

The present application claims priority to Chinese Application No. 202011375316.0 filed on Nov. 30, 2020, entitled "Heat Exchange Device", which are hereby incorporated by reference in its entirety.

FIELD OF TECHNOLOGY

The present application relates to an air treatment device, and in particular to a heat exchange device.

BACKGROUND

Chinese invention patent CN104236056B discloses a total heat exchanger 1, as shown in FIG. 1. The total heat exchanger 1 includes a case 13 with an air inlet 11 and an air outlet 12 provided on each of both sides, a fan 14 is provided on the inner side of each of the two air outlets 12, and a total heat exchange core 15 is disposed between the two air inlets 11 and the two fans 14 in the case 13. The total heat exchange core 15 is formed therein with mutually independent two heat exchange passages that may allow air flows to intersect each other, and both ends of each of the two heat exchange passages communicate with an air inlet 11 and an air outlet 12, respectively. As shown in FIG. 1, the total heat exchanger 1 of the related art is only formed with an outdoor fresh air passage and an indoor exhaust passage which communicate with the air inlet and the air outlet respectively, and thus cannot provide the internal circulation of indoor air. When making room for an indoor circulation air port by reducing the volume of the heat exchange core 15 in the total heat exchanger 1 of the related art, the heat exchange efficiency will be decreased.

BRIEF SUMMARY

Technical Problems to be Solved

The present application provides a heat exchange device capable of not only providing indoor air circulation but also ensuring heat exchange efficiency, so as to solve the above technical problems in the related art.

Technical Solutions

In order to solve the above technical problems, in a first aspect, the present application provides a heat exchange device, including: a case, an interior of which is formed into an air-supply inflow space, an exhaust inflow space, an air-supply outflow space and an exhaust outflow space separated from each other, wherein a first extension wall is provided between the air-supply inflow space and the exhaust outflow space; and a heat exchange unit disposed in the case, and the air-supply inflow space and the air-supply outflow space communicate with each other through the heat exchange unit to form an air-supply air path, and the exhaust inflow space and the exhaust outflow space communicate with each other through the heat exchange unit to form an exhaust air path, wherein the air-supply air path and the exhaust air path exchange heat when passing through the heat exchange unit; the first extension wall is provided with a circulation air port communicating the air-supply inflow space and the exhaust outflow space, wherein the circulation air port may be selectively opened and closed.

In an embodiment, the case is further provided with: an air-supply air inlet configured to allow air in a first space to enter the case and communicate with the air-supply inflow space; an air-supply air outlet configured to allow the air entering the case to blow out toward a second space and communicate with the air-supply outflow space; an air-supply air fan disposed in the air-supply outflow space and configured to guide the air from the air-supply air inlet into the case and blow toward the air-supply air outlet; an exhaust air inlet configured to allow air in the second space to enter the case and communicate with the exhaust inflow space; an exhaust air outlet configured to allow the air entering the case to blow out toward the first space and communicate with the exhaust outflow space; and an exhaust air fan disposed transversely in parallel with the air-supply air fan inside the exhaust outflow space and configured to guide the air from the exhaust air inlet into the case and blow toward the exhaust air outlet.

In an embodiment, the heat exchange unit includes: an air-supply suction port communicating with the air-supply inflow space; an air-supply vent port disposed opposite to the air-supply suction port and communicating with the air-supply outflow space; an exhaust suction port communicating with the exhaust inflow space; an exhaust vent port disposed opposite to the exhaust suction port and communicating with the exhaust outflow space; a first lateral edge formed by intersecting a plane where the air-supply suction port is located and a plane where the exhaust vent port is located; and a second lateral edge formed by intersecting a plane where the air-supply vent port is located and a plane where the exhaust suction port is located; a first side surface adjacent to the plane where the air-supply vent port is located and the plane where the exhaust vent port is located; and a second side surface adjacent to the plane where the air-supply suction port is located and the plane where the exhaust suction port is located.

In an embodiment, the case includes a first side wall, a second side wall disposed opposite to the first side wall, a front wall and a rear wall disposed between the first side wall and the second side wall and disposed opposite to each other, wherein the first extension wall is formed by extending from the first lateral edge to the first side wall; a second extension wall separating the exhaust inflow space and the air-supply outflow space is formed by extending from the second lateral edge to the second side wall; and a third extension wall separating the exhaust outflow space and the air-supply outflow space is formed by extending from the first side surface to the rear wall.

In an embodiment, the distance between the first lateral edge and the first side wall is greater than the distance between the second lateral edge and the second side wall.

In an embodiment, a heat exchange center line passing through the centers of the first side surface and the second side surface is biased to the third extension wall, and at least a part of the first side overlaps the air-supply air fan in the front-to-rear direction.

In an embodiment, a side where a motor of the air-supply air fan is located and a side where a motor of the exhaust air fan is located are disposed opposite to each other.

In an embodiment, a side where the motor of the air supply fan is located faces a side where the heat exchange unit is located.

In an embodiment, the heat exchange device further includes: a circulation air path formed by opening the circulation air port and closing the air-supply air inlet and the exhaust air outlet, wherein air blows from the exhaust air inlet to the air-supply air outlet through the circulation air port; and a circulation guide portion disposed on a downstream side of the circulation air port, and guiding air to blow from the circulation air port toward the air-supply suction port of the heat exchange unit.

In an embodiment, the circulation guide portion includes: a circulation guide side surface extending from the first extension wall toward an air-supply inflow space side and toward the air-supply suction port side of the heat exchange unit; a circulation guide top surface extending from an upper edge of the circulation guide side surface toward the first extension wall; and a circulation guide bottom surface extending from a lower edge of the circulation guide side surface toward the first extension wall, wherein the circulation guide top surface, the circulation guide side surface and the circulation guide bottom surface form a circulation guide air outlet opposite to the air-supply suction port.

In an embodiment, the circulation guide top surface includes an inclined surface inclined from the first extension wall toward the front wall side of the case and toward the lower part of the case.

In an embodiment, the heat exchange device further includes a circulation damper for selectively opening or closing the circulation air port.

In an embodiment, the heat exchange device further includes an air path switch unit disposed on an upstream side of the circulation air port to selectively switch the circulation air port and the exhaust air outlet to an open state or a closed state, and the air path switch unit includes: an air path switch motor; and a switch portion, which selectively switches the circulation air port and the exhaust air outlet to an open state or a closed state by rotation.

In an embodiment, the switch portion includes: a rotation shaft; and an air path switch plate, including a first plate on a side close to the rotation shaft and a second plate on a side far away from the rotation shaft, and the first plate and the second plate form a V-shape.

In an embodiment, the air-supply air fan and the exhaust air fan are disposed in the lower part of the case.

In an embodiment, the heat exchange device further includes a print circuit board configured to control the air-supply air fan and/or the exhaust air fan, and a circuit board box configured to receive the printed circuit board, wherein the circuit board box is disposed on the lower part of the exhaust inflow space.

In an embodiment, the heat exchange unit includes a first heat exchange core and a second heat exchange core longitudinally stacked on the first heat exchange core.

Beneficial Effects

In the above technical solutions of the present application, the first extension wall separating the air-supply inflow space and the exhaust outflow space is provided with a circulation air port that may be selectively opened or closed, so that an internal circulation air path from the exhaust air inlet to the circulation air port and then to the air-supply air outlet may be provided by selectively opening or closing the circulation air port as needed, and thus the internal circulation may be realized without changing the size of the heat exchange device, so as to achieve the indoor air circulation while ensuring the heat exchange efficiency.

REFERENCE NUMERALS

Figure 1:
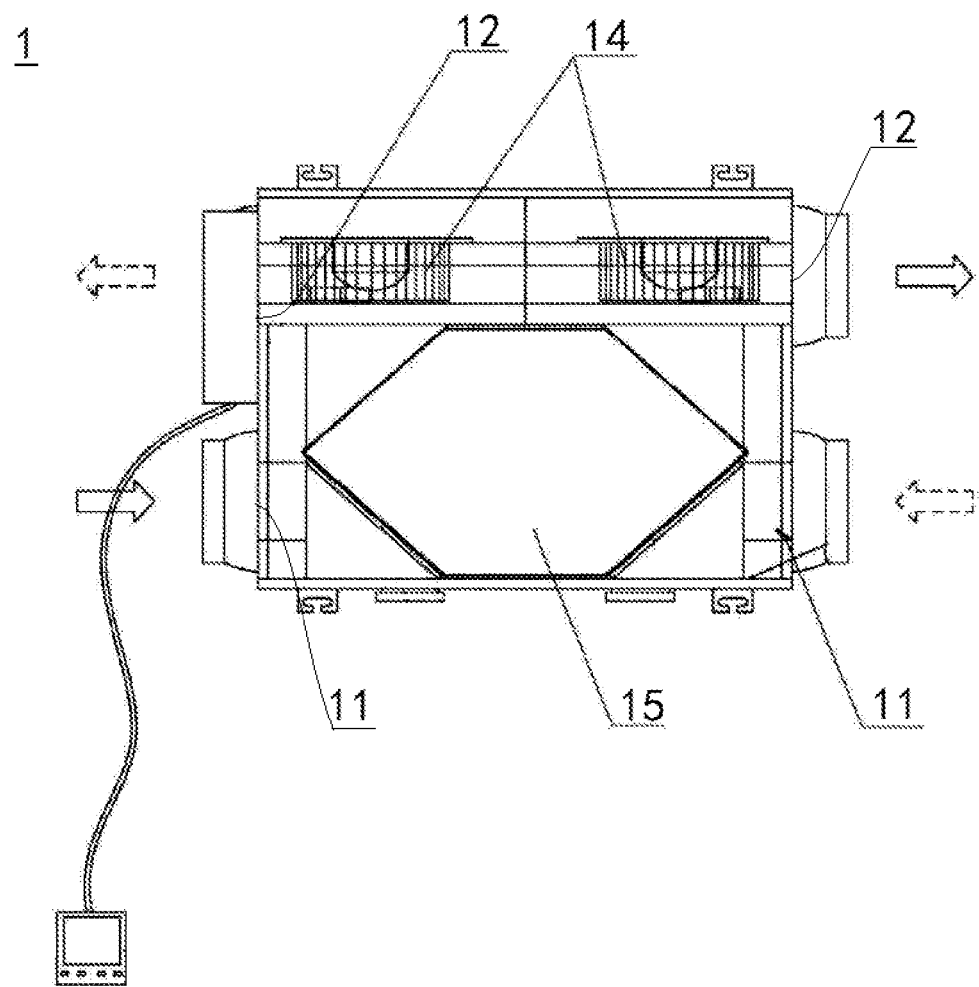
FIG. 1 is a schematic structural diagram of a total heat exchanger according to the related art.

Related Art 1 total heat exchanger; 11 air inlet; 12 air outlet; 13 case; 14 fan; 15 total heat exchange core.

<Present Application>

10 heat exchange device; 100 case; 101 first side wall; 102 second side wall; 103 front wall; 104 rear wall; 105 top wall; 106 bottom wall; 110 air-supply inflow space; 120 air-supply outflow space; 130 exhaust inflow space; 140 exhaust outflow space; 210 air-supply air inlet; 220 air-supply air outlet; 230 exhaust air inlet; 240 exhaust air outlet; 300 heat exchange unit; 301 first heat exchange core; 302 second heat exchange core; 310 air-supply suction port; 320 air-supply vent port; 330 exhaust suction port; 340 exhaust vent port; 350 first side surface; 360 second side surface; 370 first lateral edge; 380 second lateral edge; 410 first extension wall; 420 second extension wall; 430 third extension wall; 411 circulation air port; 510 exhaust air fan; 520 air-supply air fan; 501 motor; 502 casing; 503 fan blade; 504 fan air inlet; 505 fan air outlet; 504-1 fan auxiliary air inlet; 504-2 fan main air inlet; 600 outside air filter; 700 circulation guide portion; 710 circulation guide top surface; 720 circulation guide side surface; 730 circulation guide bottom surface; 740 circulation guide air outlet; 750 circulation guide fixed surface; 711 inclined surface; 810 rotation shaft; 820 air path switch plate; 821 first plate; 822 second plate; 840 switch portion; 910 circulation damper 200 circuit board box; 210 printed circuit board; 1000 air-supply air path; 2000 exhaust air path; 3000 circulation air path.

DETAILED DESCRIPTION

In order to make the objects, technical solutions and advantages of the embodiments of the present application more clear, the technical solutions in the embodiments of the present application would be clearly and completely described in the following in conjunction with the accompanying drawings in the embodiments of the present application. Obviously, these embodiments described are a part of the embodiments of the present application, and not all of the embodiments. All other embodiments obtained by a person of ordinary skill in the art based on the embodiments of the present application without any creative work belong to the protection scope of the present application.

In the description of the present application, it should be noted that the orientations or positional relationships indicated by the terms "upper", "lower", "top", "bottom", etc. are based on the installation state of the air-conditioning device. For example, the terms "upper" and "top" refer to the orientation or position away from the user's head after the air-conditioning device is installed directly above the user; while the terms "lower" and "bottom" refer to the orientation or position closer to the user's head after the air-conditioning device is installed directly above the user. The orientations or positional relationships indicated by the terms "front", "rear", "left", "right", etc. are all described based on the installation state of the air-conditioning device in the present application. In the embodiments of the present application, it should be noted that the description of this embodiment is based on the installation state of the heat exchange device. The orientation terms "front", "rear", "left", "right", etc. used in this specification refer to the front, rear, left, and right when the user's back is facing the front wall of the case, that is, in the direction indicated by the arrow in FIG. 2.

The following orientation or positional relationship are merely for the convenience of describing the present application and simplifying the description, rather than indicating or implying that the device or component stated must have a particular orientation, be constructed and operated in a particular orientation, and thus can not to be construed as limiting the application. Moreover, the terms "first", "second", and "third" are used for descriptive purposes only and are not to be construed as indicating or implying relative importance.

In the description of the present application, it should be noted that unless otherwise explicitly stated and defined, the terms "connected with" and "connected" shall be understood broadly, for example, it may be mechanically connected, or electrically connected; it may be directly connected, or indirectly connected through an intermediate medium. The specific meanings of the terms above in the present application can be understood by a person skilled in the art in accordance with specific conditions.

"The installation state of the heat exchange device" refers to the state in which the heat exchange device is installed on the ceiling or placed on the ground, and may operate normally. The heat exchange device is a device that makes the air inhaled respectively from indoors and outdoors exchange heat internally, and then discharge indoor or outdoor respectively, for example, a fresh air and exhaust ventilation equipment with a total heat exchange core. The heat exchange referred to herein is a process of heat transfer and energy exchange between spaces due to temperature differences.

The following is an explanation of a heat exchange device according to a first embodiment of the present application with reference to FIGS. 2 to 6. The heat exchange device according to this embodiment may be installed in a second space, where a first space and the second space are separated by a wall. For example, the first space may be outdoor and the second space may be indoor. The heat exchange device 10 includes a case 100, a heat exchange unit 300, an air-supply air fan 520, an exhaust air fan 510, an outside air filter 600, a circulation guide portion 700, a circuit board box 200, etc.

Figure 2:
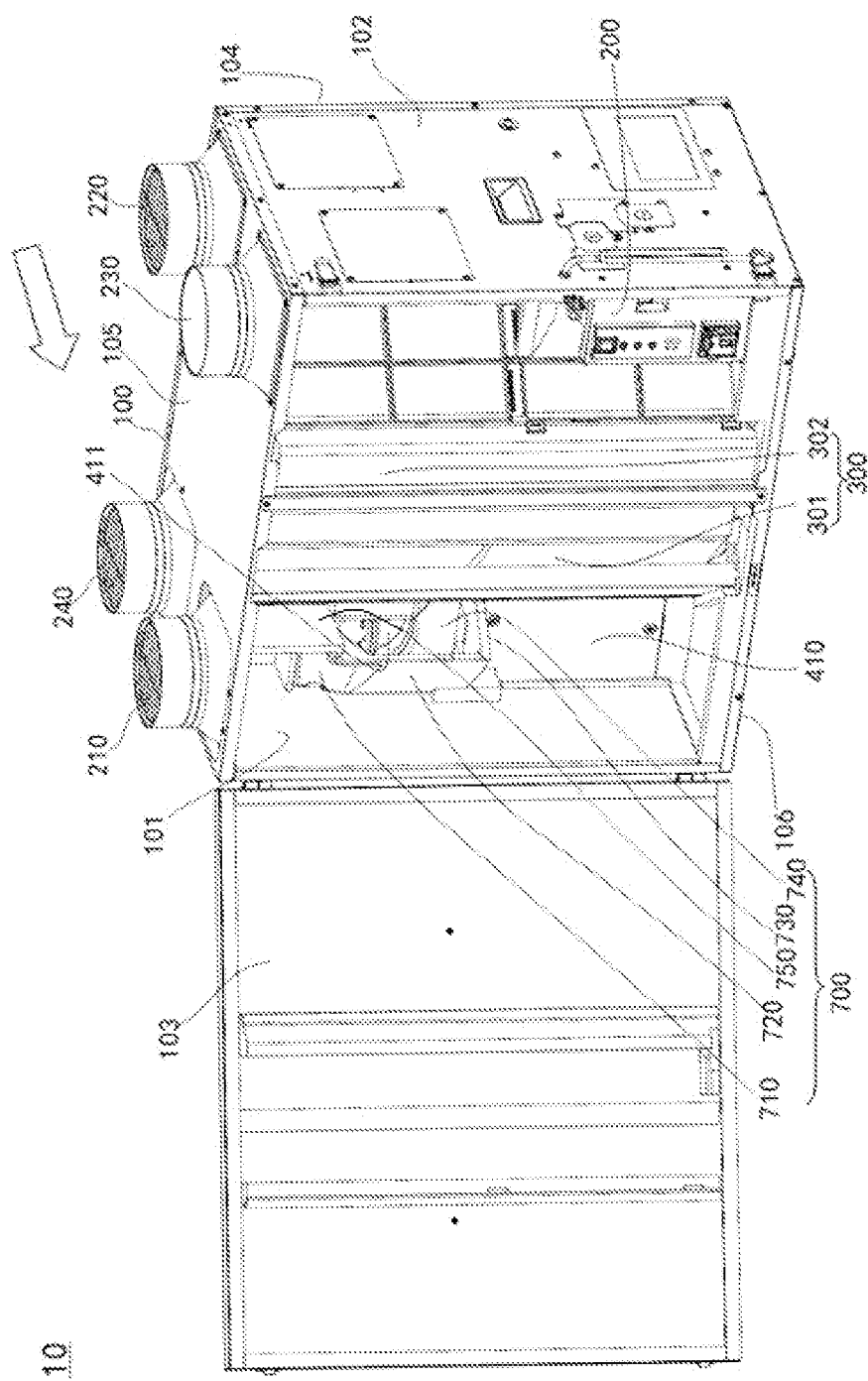
FIG. 2 is a schematic structural diagram of a heat exchange device according to a first embodiment of the present application.

FIG. 2 is a schematic structural diagram of the heat exchange device according to the first embodiment of the present application. With reference to FIG. 2, the case 100 is configured to form an outer profile of the heat exchange device 10 and is in the shape of a hollow cuboid box. The case 100 includes: a top wall 105, a bottom wall 106, and four side walls 101-104. From the perspective of FIG. 2, the top wall 105 and the bottom wall 106 are surfaces located at the top and bottom of the case 100, respectively. The four side walls 101-104 are respectively a first side wall 101 disposed on the right side, a second side wall 102 disposed on the left side of the case 100 opposite to the first side wall, a front wall 103 disposed in the front of the case 100 and a rear wall 104 disposed at the rear of the case 100 adjacent to the first side wall 101 and the second side wall 102, and the front wall 103 and the rear wall 104 are disposed opposite to each other. The front wall 103 is connected with the case 100 by a hinge structure, and serves as a spot check door for providing the functions of opening and closing the heat exchange device 10 during spot check. For example, the front wall 103 may be hinged on any one of the top wall 105, the first side wall 101, the second side wall 102, and the bottom wall 106. In this embodiment, the front wall 103 may be hinged on the first side wall 101 so that it may be opened from the left side to the right side.

The case 100 is provided with an air-supply air inlet 210, an air-supply air outlet 220, an exhaust air inlet 230, and an exhaust air outlet 240.

The air-supply air inlet 210 is an opening that communicates the interior of the case 100 with the first space through a pipeline to allow the air in the first space to enter the interior of the case 100. The air-supply air inlet 210 is disposed on the top wall 105 of the case 100 and located at the front right side of the case 100. However, the air-supply air inlet 210 is not limited to being disposed on the top wall 105, and may also be disposed on the first side wall 101. In the heat exchange mode, the air-supply air inlet 210 is opened, and in the internal circulation mode, the air-supply air inlet 210 is closed by providing a circulation damper or the like.

The air-supply air outlet 220 is an opening that communicates the interior of the case 100 with the second space through a pipeline to allow the air inside the case 100 to blow out of the second space. The air-supply air outlet 220 is disposed on the top wall 105 or the second side wall 102 of the case 100 or both, and is located at the rear left side of the case 100. Specifically, a user may select whether to use the air-supply air outlet 220 disposed on the top wall 105 or the air-supply air outlet 220 disposed on the second side wall 102 according to the installation position and installation space of the heat exchange device 10. When one of the air-supply outlets is selected, the other air-supply outlet may be blocked. In either the heat exchange mode or the internal circulation mode, the air-supply air outlet 220 is opened.

The exhaust air inlet 230 is an opening that communicates the interior of the case 100 with the second space through a pipeline to allow the air in the second space to be sucked into the case 100. The exhaust air inlet 230 is disposed on the top wall 105 or the second side wall 102 of the case 100 or both, and is located at the front left side of the case 100. Specifically, when the exhaust air inlets 230 are disposed on the top wall 105 or the second side wall 102 of the case 100, a user may select whether to use the exhaust air inlet 230 disposed on the top wall 105 or the exhaust air inlet 230 disposed on the second side wall 102 according to the installation position and installation space of the heat exchange device 10. When one of the exhaust air inlets is selected, the other exhaust air inlet may be blocked. In either the heat exchange mode or the internal circulation mode, the exhaust air outlet 230 is opened.

The exhaust air outlets 240 is an opening that communicates the interior of the case 100 with the first space through a pipeline to allow the air inside the case 100 to blow out of the first space. The exhaust air outlets 240 are disposed on the top wall 105 of the case 100 and located at the rear right side of the case 100. In the heat exchange mode, the exhaust air outlet 240 is opened, and in the internal circulation mode, the exhaust air outlet 240 is closed by providing a circulation damper or the like.

The air-supply air path 1000 is an air path communicating the air-supply air inlet 210 with the air-supply air outlet 220, so that the air passing through the air-supply air path 1000 flows from the air-supply air inlet 210 to the air-supply air outlet 220.

The exhaust air path 2000 is an air path communicating the exhaust air inlet 230 with the exhaust air outlet 240, so that the air passing through the exhaust air path 2000 flows from the exhaust air inlet 230 to the exhaust air outlet 240.

The interior of the case 100 is divided into at least four spaces including an air-supply inflow space 110, an air-supply outflow space 120, an exhaust inflow space 130, and an exhaust outflow space 140 by a first extension wall 410, a second extension wall 420, a third extension wall 430, and a heat exchange unit 300, etc. described later. The air-supply inflow space 110, the air-supply outflow space 120, the exhaust inflow space 130 and the exhaust outflow space 140 are separated from each other. The air-supply inflow space 110 and the air-supply outflow space 120 communicate with each other by the heat exchange unit 300 to form the air-supply air path 1000; the exhaust inflow space 130 and the exhaust outflow space 140 communicate with each other by the heat exchange unit 300 to form the exhaust air path 2000; the air-supply air path 1000 and the exhaust air path 2000 exchange heat when passing through the heat exchange unit 300.

Specifically, the air-supply inflow space 110 which communicates with the air-supply air inlet 210 is a space disposed on the front right side of the case 100.

Specifically, the air-supply outflow space 120 which communicates with the air-supply air outlet 220 is a space disposed on the rear left side of the case 100.

Specifically, the exhaust inflow space 130 which communicates with the exhaust air inlet 230 is a space disposed on the front left side of the case 100.

Specifically, the exhaust outflow space 140 which communicates with the exhaust air outlet 240 is a space disposed on the rear right side of the case 100.

The first extension wall 410 extends from a first lateral edge 370 of the heat exchange unit 300 described later to the first side wall 101, and is disposed between the air-supply inflow space 110 and the exhaust outflow space 140 to separate the air-supply inflow space 110 from the exhaust outflow space 140. The first extension wall 410 is provided with a circulation air port 411 communicating the air-supply inflow space 110 and the exhaust outflow space 140, and a circulation guide portion 700 is provided near the circulation air port 411 to guide air to flow from the exhaust outflow space 140 toward the air-supply suction port 310 of the heat exchange unit 300, so as to realize indoor air circulation (which will be described in detail below). The circulation air port 411 is selectively opened and closed to realize indoor air circulation as required.

The second extension wall 420 extends from a second lateral edge 380 of the heat exchange unit 300 described later to the second side wall 102, and is disposed between the exhaust inflow space 130 and the air-supply outflow space 120 to separate the exhaust inflow space 130 from the air-supply outflow space 120.

The third extension wall 430 extends along the direction from the rear wall 104 to the front wall 103 to a first side surface 350 of the heat exchange unit 300 described later, that is, extends from the first side surface 350 of the heat exchange unit 300 to the rear wall 104, and is disposed between the exhaust outflow space 140 and the air-supply outflow space 120 to separate the exhaust outflow space 140 from the air-supply outflow space 120.

The heat exchange unit 300 is provided within the case 100. The heat exchange unit 300 is formed by sticking a plurality of thin plates together. The heat exchange unit 300 includes: an air-supply suction port 310 communicating with the air-supply inflow space 110; an air-supply vent port 320 disposed opposite to the air-supply suction port 310 and communicating with the air-supply outflow space 120; an exhaust suction port 330 communicating with the exhaust inflow space 130; and an exhaust vent port 340 disposed opposite to the exhaust suction port 330 and communicating with the exhaust outflow space 140.

A first air path is formed between the air-supply suction port 310 and the air-supply vent port 320, a second air path is formed between the exhaust suction port 330 and the exhaust vent port 340, and the first air path and the second air path are mutually independent and intersect, so that the air passing through the air-supply air path 1000 and the air passing through the exhaust air path 2000 exchange energy with each other. The first air path is located in the air-supply air path 1000, and the second air path is located in the exhaust air path 2000. As a result, air enters the air-supply inflow space 110 from the air-supply air inlet 210, then enters the heat exchange unit 300 through the air-supply suction port 310, enters the air-supply outflow space 120 through the air-supply vent port 320, and finally is discharged to the second space through the air-supply air outlet 220, that is, flows along the air-supply air path 1000. In addition, air enters the exhaust inflow space 130 from the exhaust air inlet 230, then enters the heat exchange unit 300 through the exhaust suction port 330, enters the exhaust outflow space 140 through the exhaust vent port 340, and finally is discharged to the first space through the exhaust air outlet 240, that is, flows along the exhaust air path 2000. The air flows along the air-supply air path 1000 and the exhaust air path 2000, and exchanges heat when passing through the heat exchange unit 300. For example, the heat exchange unit 300 may be a total heat exchange core.

Figure 3:
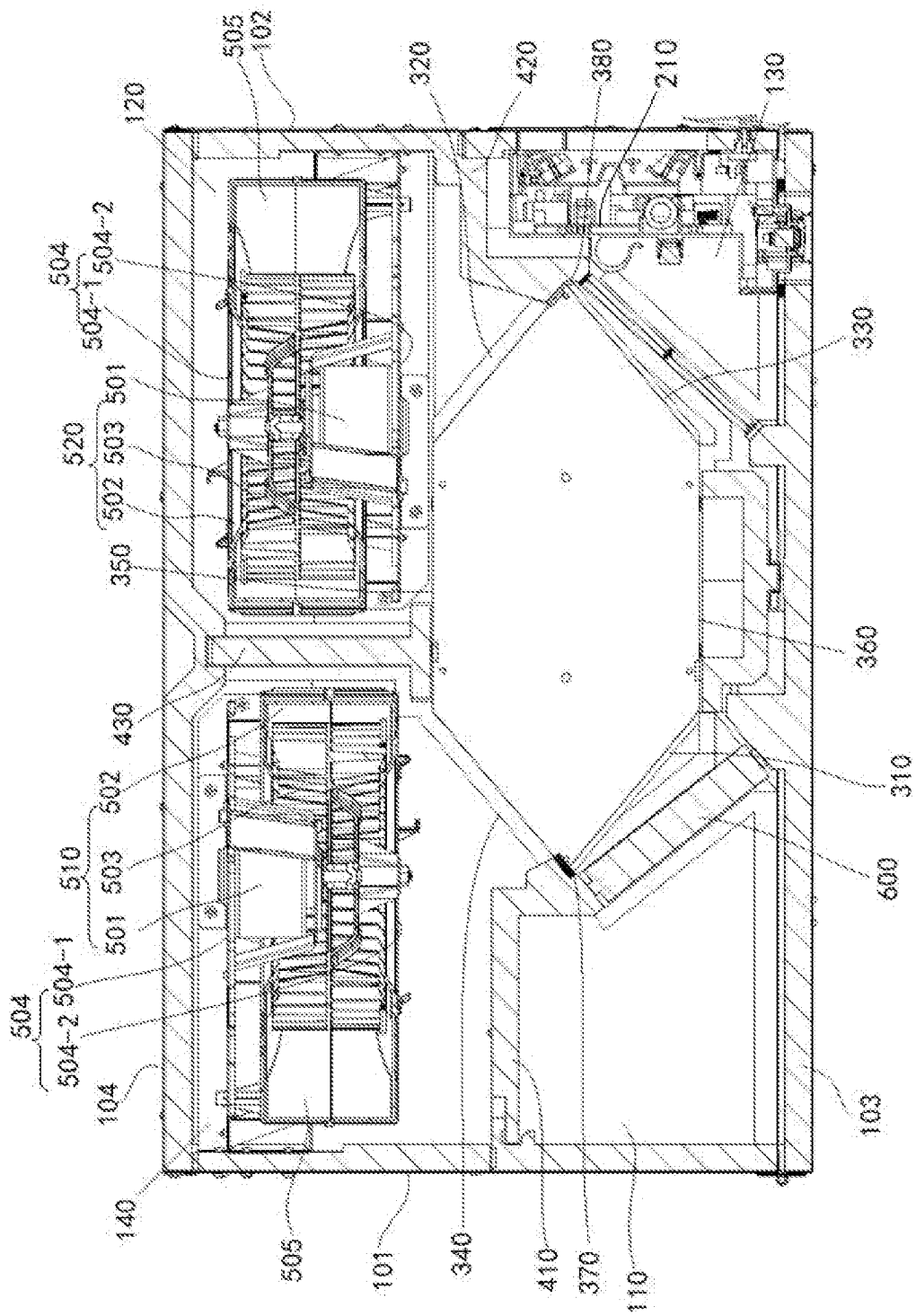
FIG. 3 is a transverse cross-sectional view of FIG. 2.
Figure 4:
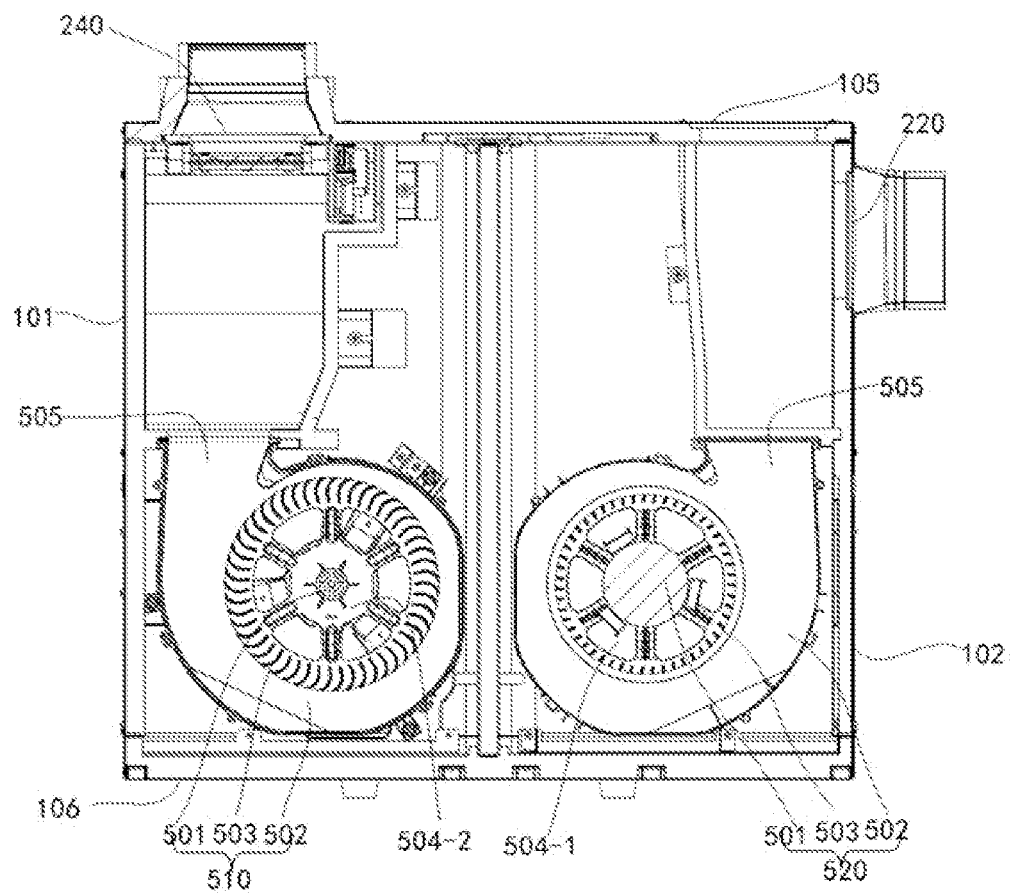
FIG. 4 is a longitudinal cross-sectional view of FIG. 2 in which an exhaust air inlet and an air-supply air outlet provided on a second side are used.
Figure 5:
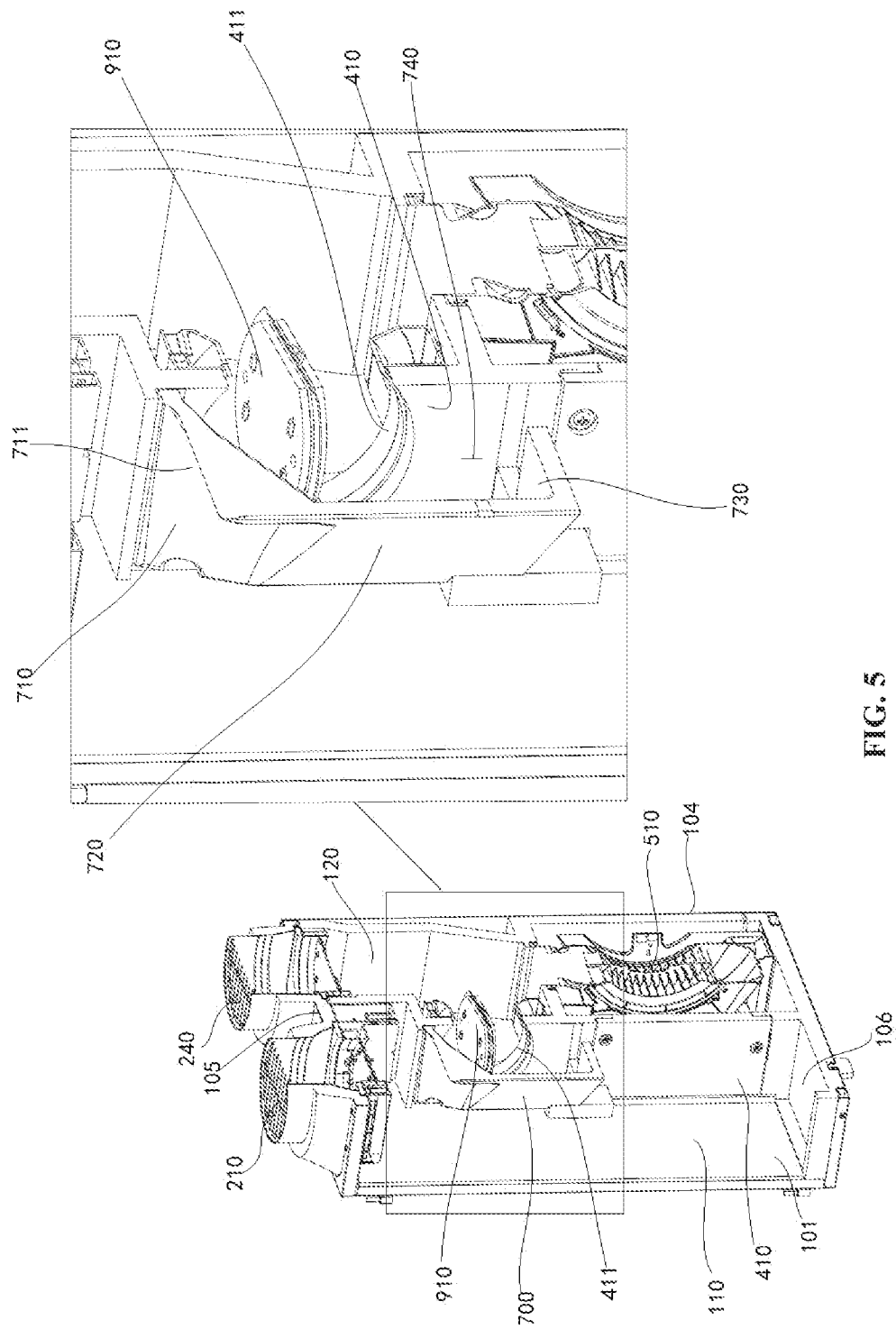
FIG. 5 shows a partial structure and an enlarged view of FIG. 2.
Figure 6:
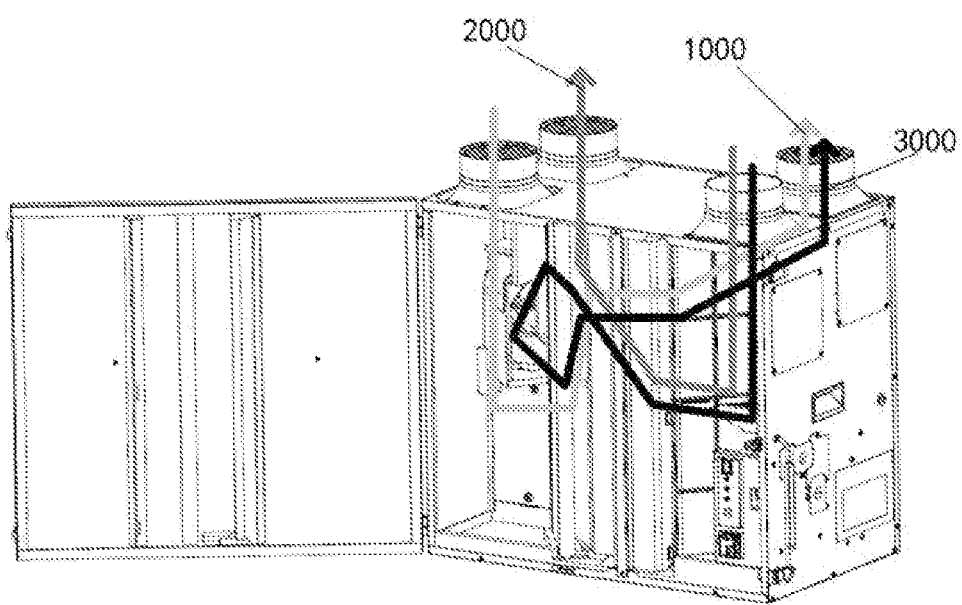
FIG. 6 is a schematic diagram of an exhaust air path, an air-supply air path, and a circulation air path in a heat exchange device according to an embodiment of the present application.

The heat exchange unit 300 may include a first heat exchange core 301 disposed at the lower part of the case 100 and a second heat exchange core 302 longitudinally placed on the first heat exchange core 301. The second heat exchange core 302 is located at the upper part of the case 100. According to other embodiments, the heat exchange unit 300 may be composed of one heat exchange core, or may be composed of two or more heat exchange cores. Referring to FIG. 3, in this embodiment, the first heat exchange core 301 and the second heat exchange core 302 are both parallelepipeds, including: a plane where the air-supply suction port 310 is located and a plane where the air-supply vent port 320 is located in the air-supply air path 1000, a plane where the exhaust suction port 330 is located and a plane where the exhaust vent port 340 is located in the exhaust air path 2000, a first side surface 350 adjacent to the plane where the air-supply vent port 320 is located and the plane where the exhaust vent port 340 is located, and a second side surface 360 adjacent to the plane where the air-supply suction port 310 is located and the plane where the exhaust suction port 330 is located.

In an embodiment, the first side surface 350 is adjacent to the plane where the air-supply vent port 320 is located and the plane where the exhaust vent port 340 is located. The air entering the heat exchange core cannot enter the heat exchange core from the first side surface 350, and the air having entered the heat exchange coret cannot be blown out from the first side surface 350.

The second side surface 360 is adjacent to the plane where the air-supply suction port 310 is located and the plane where the exhaust suction port 330 is located. The air entering the heat exchange core cannot enter the heat exchange core from the second side surface 360, and the air having entered the heat exchange core cannot be blown out from the second side surface 360.

In addition, a first lateral edge 370 is formed by intersecting the plane where the air-supply suction port 310 is located and the plane where the exhaust vent port 340 is located, and a second lateral edge 380 is formed by intersecting the plane where the air-supply vent port 320 is located and the plane where the exhaust suction port 330 is located. The first lateral edge 370 and the second lateral edge 380 extend in the vertical direction. As described above, in the case where the circulation air port 411 is disposed on the first extension wall 410 and the circulation guide portion 700 is disposed near the circulation air port 411, in order to ensure sufficient space for the circulation guide portion 700, the heat exchange unit 300 is disposed in the case 100 in a biased manner, that is, the distance between the first lateral edge 370 and the first side wall 101 of the case 100 is greater than the distance between the second lateral edge 380 and the second side wall 102 of the case 100. As shown in FIG. 3, L1>L2.

The air-supply air fan 520 is disposed within the air-supply outflow space 120. In other words, the air-supply air fan 520 is disposed on the left rear side of the case 100. The air-supply air fan 520 is configured to guide the air in the case 100 to blow out from the air-supply air outlet 220. The exhaust air fan 510 is disposed within the exhaust outflow space 140. In other words, the exhaust air fan 510 is disposed on the right rear side of the case 100. The exhaust air fan 510 is configured to guide the air in the case 100 to blow out from the exhaust air outlet 240. The air-supply air fan 520 and the exhaust air fan 510 are located at the rear of the case 100 and are disposed in parallel and laterally at the lower part of the case 100 opposite to the first heat exchange core 301. The air-supply air fan 520 and the exhaust air fan 510 are disposed at the lower part of the case 100, so as to ensure the stability of the air-supply air fan 520 and the exhaust air fan 510 and avoid shaking caused by operation.

Each of the air-supply air fan 520 and the exhaust air fan 510 includes a motor 501, a casing 502, and fan blades 503 located in the casing 502. The motor 501 has a rotary shaft, and the fan blades 503 are connected with the rotary shaft and driven to rotate by the rotation of the rotary shaft of the motor 501 to generate air flows. For example, the fan blades 503 may be multi-wing centrifugal fan blades. Each of the air-supply air fan 520 and the exhaust air fan 510 is provided with a fan air inlet 504 and a fan air outlet 505 for discharging air entering from the fan air inlet 504 via the fan air outlet 505. Wherein, the fan air inlet 504 of this embodiment includes a fan auxiliary air inlet 504-1 disposed on one side where the motor is disposed and a fan main air inlet 504-2 located on the other side. The fan auxiliary air inlet 504-1 has smaller air inlet area than the fan main air inlet 504-2 since the fan auxiliary air inlet 504-1 is provided with a motor, which is, however, not limited in the present application. The fan air inlet 504 may also include only one fan main air inlet 504-2 disposed on the other side of the motor, and no fan auxiliary air inlet 504-1 is disposed on the side where the motor is disposed.

Specifically, the air-supply air fan 520 and the exhaust fan 510 may adopt fans of the same specification, that is, the air-supply air fan 520 and the exhaust air fan 510 may have the same size and shape, so that the third extension wall 430 separating the air-supply outflow space 120 and the exhaust outflow space 140 may be located on the central axis of the case 100. As described above, in the case where the circulation guide portion 700 is provided, the heat exchange unit 300 is disposed in the case 100 in a biased manner. Specifically, a heat exchange center line passing through the centers of the first side surface 350 and the second side surface 360 is biased to the third extension wall 430, that is, biased toward the air-supply air fan 520, and at least a part of the first side surface 350 overlaps the air-supply air fan 520 in the front-to-rear direction. The "biased" here means that the third extension wall 430 and the heat exchange center line passing through the centers of the first side surface 350 and the second side surface 360 are not collinear, not opposite, but staggered with each other.

In this embodiment, the side of the air-supply air fan 520 where the motor is provided is opposite to the side of the exhaust air fan 510 where the motor is provided, that is to say, the air-supply air fan 520 and the exhaust air fan 510 have inconsistent placement directions. For example, the side of the air-supply air fan 520 where the motor is provided faces the second extension wall 420, and the side of the exhaust air fan 510 where the motor is provided faces the rear wall 104 of the case 100. This is because, as described above, the circulation air port 411 is disposed on the first extension wall 410 and the circulation guide portion 700 is disposed near the circulation air port 411. In order to ensure the installation space of the circulation guide portion 700, the heat exchange unit 300 is more biased to the air-supply air fan 520, such that the heat exchange unit 300 and the air-supply air fan 520 partially overlap. In this case, if the air-supply air fan 520 and the exhaust air fan 510 are disposed in the same direction, that is, the sides thereof where the motors are provided both face the rear wall 104 of the case 100, the heat exchange unit 300 will partially block the fan main air inlet 504-2 of the air-supply air fan 520. In view of this, the side of the air-supply air fan 520 where the motor is provided faces the second extension wall 420, that is, the fan main air inlet 504-2 of the air-supply air fan 520 faces the rear wall 104 of the case 100, thereby preventing it from being blocked by the heat exchange unit 300 to ensure the air volume.

The outside air filter 600 has a cuboid shape, and is located on the downstream side of the air-supply air inlet 210 and the downstream side of the exhaust air inlet 230 in the air-supply air path 1000, specifically, on the upstream side of the air-supply suction port 310 and the exhaust suction port 330 of the heat exchange unit 300, that is, located between the air-supply air inlet 210 and the air-supply air inlet 310 as well as between the exhaust air inlet 230 and the exhaust suction port 330, which may purify air sucked from the air-supply air inlet 210 and the exhaust air inlet 230 and prevent dust and fine particles from entering the heat exchange unit 300. The outside air filter 600 may be a filter screen or a filter with one or more filtration effects, or a combination of multiple filter screens or filters with one or more filtration effects.

The circulation air port 411, which is located on the right side of the heat exchange unit 300, is an opening disposed on the first extension wall 410 to communicate the air-supply inflow space 110 and the exhaust outflow space 140. The circulation air port 411 may be selectively opened or closed.

In this embodiment, the heat exchange device 10 may include a circulation damper 910. The circulation damper 910 may cover the surface of the circulation air port 411 for selectively opening or closing the circulation air port 411.

The heat exchange device 10 may include a circulation damper motor. After being energized, the circulation damper motor, such as a gear motor, rotates around the rotation axis thereof, and drives the circulation damper 910 to perform angular transformation.

The heat exchange device 10 may further include a circulation air path 3000 formed by opening the circulation air port 411 and closing the air-supply air inlet 210 and the exhaust air outlet 240. Through the circulation air path 3000, air enters the exhaust inflow space 130 of the case 100 from the exhaust air inlet 230, then enters the heat exchange unit 300 from the exhaust suction port 330, enters the exhaust outflow space 140 from the exhaust vent port 340 through the first air path, then flows to the air-supply suction port 310 of the heat exchange unit 300 through the circulation air port 411, then enters the heat exchange unit 300, enters the air-supply outflow space 120 from the air-supply vent port 320 through the second air path, and is finally discharged to the second space through the air-supply air outlet 220 to realize indoor air circulation.

The circulation guide portion 700 is disposed near the circulation air port 411, and is located on the side of the first extension wall 410 where the air-supply inflow space 110 is located, and on the downstream side of the circulation air port 411 to form a semi-enclosing circulation air port 411 for guiding air blown from the circulation air port 411 to blow to the air-supply suction port 310 of the heat exchange unit 300. The circulation guide portion 700 includes a circulation guide top surface 710, a circulation guide side surface 720, a circulation guide bottom surface 730, a circulation guide air outlet 740, and a circulation guide fixed surface 750.

The circulation guide side surface 720 extends from the first extension wall 410 toward a side where the air-supply inflow space 110 is located and at the same time toward a side of the heat exchange unit 300 where the air-supply suction port 310 is located, and has a curved surface.

The circulation guide top surface 710 extends from the upper edge of the circulation guide side surface 720 toward the first extension wall 410 along a direction opposite to the air-supply air inlet 210. The circulation guide top surface 710 includes an inclined surface 711.

The inclined surface 711 is inclined from the first extension wall 410 to the front wall 103 of the case 100 and toward the lower part of the case 100. The air entering from the air-supply air inlet 210 is guided along the inclined surface 711 of the circulation guide top surface 710 of the circulation guide portion 700 and smoothly flow downward.

The circulation guide bottom surface 730 extends from the lower edge of the circulation guide side surface 720 toward the first extension wall 410.

The circulation guide fixed surface 750 extends from the edge of the circulation guide top surface 710 to the top wall 105 of the case 100 and is configured to fix the circulation guide portion 700 to the top wall 105. However, the present application is not limited to this, and the circulation guide portion 700 may be fixed by other fixing methods.

The circulation guide air outlet 740 is formed by the circulation guide top surface 710, the circulation guide side surface 720 and the circulation guide bottom surface 730, and is disposed opposite to the air-supply suction port 310 of the heat exchange unit 300 to guide the air to flow toward the air-supply suction port 310 of the heat exchange unit 300.

It should be noted that the circulation guide top surface 710 and the circulation guide bottom surface 730 of the circulation guide portion 700 may be integrally formed with the first extension wall 410 or disposed in close contact with the first extension wall 410.

The heat exchange unit 300 according to this embodiment may further include a printed circuit board 210 and a circuit board box 200. The circuit board box 200 is disposed inside the exhaust inflow space 130, and is located at the lower part of the exhaust inflow space 130 relative to the second heat exchange core. Electrical components such as a printed circuit board 210 are provided inside the circuit board box 200.

The printed circuit board 210 is disposed within the circuit board box 200, and is configured to control the operation of the air-supply air fan 520 and/or the exhaust air fan 510 after receiving an electrical signal.

Next, a heat exchange mode and an internal circulation mode of the heat exchange device 10 of this embodiment are taken as examples, and the operation process of the heat exchange device 10 of this embodiment will be described.

When the heat exchange device 10 is in the heat exchange mode, the circulation air port 411 is closed, and the air-supply air outlet 220 and the air-supply air inlet 210 are opened. At this time, the printed circuit board 210 controls the air-supply air fan 520 and the exhaust air fan 510 to start, outdoor air entering the case 100 from the air-supply air inlet 210 and indoor air entering the case 100 from the exhaust air inlet 230 enter the heat exchange unit 300 respectively after passing through the outside air filter 600 disposed on the upstream side of the heat exchange unit 300, and these two air flows exchange energy with each other at the heat exchange unit 300. After the energy is exchanged, the air is blown out from the air-supply air outlet 220 and the exhaust air outlet 240 to indoor and outdoor, respectively.

In addition, in this embodiment, in order to make the installation more convenient for the user, not only the top wall 105 of the case 100 is provided with the exhaust air inlet 230 and the air-supply air outlet 220, but also the side wall of the case 100, that is, the second side wall 102 is also provided with openings reserved for the exhaust air inlet 230 and the air-supply air outlet 220. When the user connects a pipeline to the exhaust air inlet 230 and the air-supply air outlet 220 on the top wall 105, the openings at the second side wall 102 are closed. When the user intends to connect a pipeline to the exhaust air inlet 230 and the air-supply air outlet 220 reserved on the second side wall 102, the pipeline may be connected to the second side wall 102 as long as the closure plates for enclosing the exhaust air inlet 230 and the air-supply air outlet 220 on the second side wall 102 are removed and the exhaust air inlet 230 and the air-supply air outlet 220 on the top wall 105 are covered.

When the heat exchange device 10 is in the internal circulation mode, the circulation air port 411 is opened, and the exhaust air outlet 240 and the air-supply air inlet 210 are closed. The printed circuit board 210 controls the air-supply air fan 520 and the exhaust air fan 510 to start. Indoor air entering the case 100 through the exhaust air inlet 230 passes through the heat exchange unit 300, enters the exhaust outflow space 140, and then enters the air-supply inflow space 110 through the circulation air port 411, and is discharged into the room through the air-supply air outlet 220 after entering the heat exchange unit 300 again, thereby realizing indoor air circulation. A circulation guide portion 700 is disposed on the downstream side of the circulation air port 411. The air entering the air-supply inflow space 110 from the exhaust outflow space 140 will be guided along the circulation guide side surface 720 and blown from the circulation air port 411 to the air-supply suction port 310 of the heat exchange unit 300.

In the heat exchange device 10 of this embodiment, the distance L1 from the first lateral edge 370 of the heat exchange unit 300 to the first side wall 101 is greater than the distance L2 from the second lateral edge 380 of the heat exchange unit 300 to the second side wall 102. That is to say, the heat exchange unit 300 has different left and right distances, and is located closer to the left side of the case 100. In this way, there is enough space to dispose the circulation air port 411 and the circulation guide portion 700 on the right side of the heat exchange unit 300, so as to realize indoor circulation without increasing the overall height of the heat exchange device 10.

When the heat exchange unit 300 is biased to the left, that is to say, when the heat exchange center line passing through the centers of the first side surface 350 and the second side surface 360 is disposed on the left side of the third extension wall, not only the first side surface 350 of the heat exchange unit 300 will block a part of the air-supply air fan 520 disposed on the left side of the case 100, and the heat exchange unit will also block a part of the air inflow area of the exhaust air inlet 230, resulting in a reduction in the air volume of the exhaust air path 2000. Therefore, in order to optimize the structure, in this embodiment, the heat exchange unit 300 is biased not only to the left but also to the rear side, which shortens the distance between the heat exchange unit 300 and the air-supply air fan 520 disposed on the rear side of the heat exchange unit 300, and thus the blocked area of the exhaust air inlet 230 is reduced. In addition, in order to ensure the air intake volume of the air-supply air fan 520, the fan main air inlet 504-2 of the air-supply air fan 520 is disposed facing the rear wall 104 of the case 100 in this embodiment. In this way, the fan main air inlet 504-2 of the air-supply air fan 520 will not be blocked by the heat exchange unit 300 moved to the left. The air inflow area of the air-supply air fan 520 is ensured, so that the air volume of the heat exchange device 10 is also ensured.

Furthermore, the fan main air inlet 504-2 of the air-supply air fan 520 is disposed facing the rear wall 104 of the case 100, so that the fan air outlet 504 is closer to the second side wall 102. In this way, when the air-supply air outlet 220 is disposed on the second side wall 102, the distance that the air is discharged from the air-supply air outlet 220 is shorter, and the pressure loss is smaller.

In addition, the exhaust outflow space 140 and the air-supply inflow space 110 may be communicated through the circulation air port 411 disposed on the first extension wall 410. In the circulation mode, most of the air blown from the circulation air port 411 will directly enter the heat exchange unit 300 under the guidance of the circulation guide portion 700, instead of entering the air-supply inflow space 110 and then entering the heat exchange unit 300. As a result, the circulation air path 3000 is smoother, the distance between the circulation air port 411 and the heat exchange unit 300 is shortened, and the pressure loss is smaller. Since the circulation guide portion 700 is a semi-enclosing structure, a part of the air will be directly blown to the air-supply suction port 310 on the side of the second heat exchange core 302, and the other part of the air will be discharged from the circulation guide air outlet 740 opposite to the air-supply suction port 310 to the air-supply suction port 310 on the side of the first heat exchange core 301, so that the air may enter the heat exchange unit 300 uniformly, and the utilization efficiency of the heat exchange unit 300 is ensured.

Furthermore, by disposing the circulation guide portion 700 on the downstream side of the circulation air port 411, not only the circulation air path 3000 is made smoother, but also the surface of the circulation damper 910 is prevented from frosting in the heat exchange mode. In the heat exchange mode, the air-supply air inlet 210 is opened, and the circulation air port 411 is closed. Since the circulation air port 411 is disposed at the first extension wall 410 close to the air-supply air inlet 210 and is perpendicular to the air-supply air inlet 210, when no circulation guide portion 700 is disposed on the downstream side of the circulation air port 411, air entering from the air-supply air inlet 210 will pass through the surface of the circulation damper 910 that closes the circulation air port 411, so that the surface of the circulation damper 910 will be frosted, causing the circulation damper 910 to fail. Therefore, by disposing the circulation guide portion 700, the air entering from the air-supply air inlet 210 is in contact with the circulation guide portion 700, and will not be directly blown to the circulation air port 411, thereby preventing the circulation damper 910 from frosting and ensuring that the circulation damper 910 may work normally.

In addition, in order to ensure the air volume, the circulation guide top surface 710 of the circulation guide portion 700 is provided with an inclined surface 711 inclined from the first extension wall 410 toward the front wall 103 of the case 100 and toward the lower part of the case 100, so that the pressure loss of the air entering from the air-supply air inlet 210 will not increase due to the contact of the air with the circulation guide top surface 710, but the air is guided by the inclined surface 711 of the circulation guide top surface 710 of the circulation guide portion 700 and is blown smoothly to the lower part of the air-supply inflow space 110, and thus the pressure loss is not increased while ensuring a smooth air path. Further, the circulation guide portion 700 is provided with a circulation guide air outlet 740, that is, the circulation guide portion 700 is not connected to the heat exchange unit 300, so the air entering from the air-supply air inlet 210 may not only enter the heat exchange unit 300 from the air-supply suction port 310 on the side of the second heat exchange core 302, but also enter the heat exchange unit 300 from the air-supply suction port 310 on the side of the first heat exchange core 301. It is possible to ensure the air volume of heat exchange while preventing the circulation damper 910 of the circulation air port 411 from frosting.

On the other side of the case 100, the circuit board box 200 is disposed in the lower part of the exhaust inflow space 130, so that in the heat exchange mode, the air entering from the exhaust air inlet 230 will not enter the heat exchange unit 300 only from the exhaust suction port 330 on the side of the second heat exchange core 302 due to the air-supply air fan 520 being disposed at the lower part of the case 100, which reduces the utilization efficiency of the heat exchange unit 300. In this embodiment, a part of the air inflow area of the exhaust suction port 330 on the side of the second heat exchange core 302 is blocked by disposing the circuit board box 200 at the lower part of the exhaust inflow space 130, so that a part of the air entering from the exhaust air inlet 230 will enter the heat exchange unit 300 from the exhaust suction port 330 on the side of the first heat exchange core 301 where the pressure loss is relatively small. As a result, the air entering the heat exchange unit 300 through the exhaust inflow space 130 no longer concentratedly enters the heat exchange unit 300 only from the exhaust suction port 330 close to the second heat exchange core 302, but enters the entire exhaust suction port 330 relatively uniformly, which ensures the utilization efficiency of the heat exchange unit 300.

Figure 7:
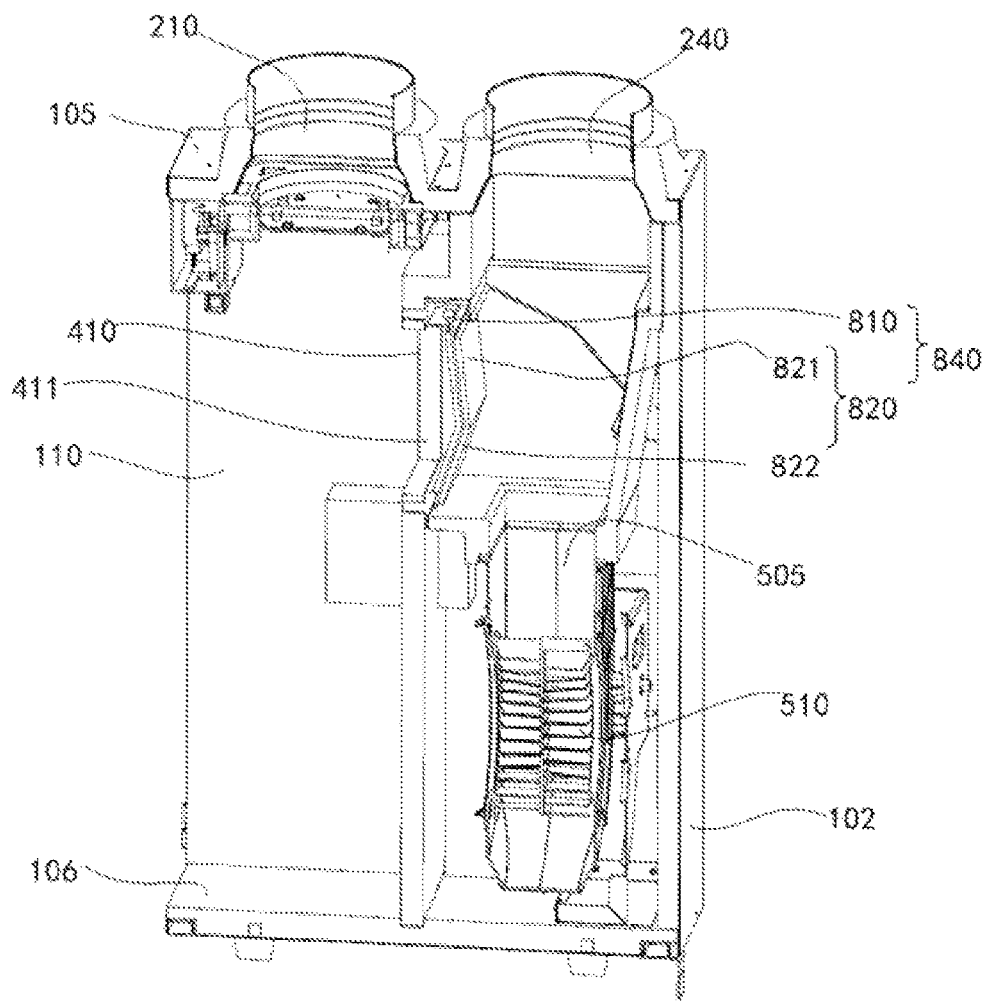
FIG. 7 shows a partial structure of a heat exchange device according to a second embodiment of the present application.

Hereinafter, the heat exchange device according to the second embodiment of the present application, in which the circulation damper at the circulation air port is improved on the basis of the heat exchange device according to the first embodiment of the present application, will be described in detail with reference to FIG. 7.

The heat exchange device according to the second embodiment of the present application includes an air path switch unit. The air path switch unit is disposed on an upstream side of the circulation air port 411 to selectively switch the circulation air port 411 and the exhaust air outlet 240 to an open state or a closed state.

The air path switch unit is disposed within the exhaust outflow space 140 and is provided with a function of switching the circulation air port 411 and the exhaust air outlet 240 to an open state or a closed state. The air path switch unit includes an air path switch motor and a switch portion 840.

After being energized, the air path switch motor, for example, a step motor, rotates around the rotation axis of the air path switch motor, and allows the switch portion 840 to perform angular transformation on the air blown by the exhaust air fan 510.

The switch portion 840 is configured to guide the air blown from the exhaust air fan 510 to the circulation air port 411 or the exhaust air outlet 240 according to the position of an air path switch plate described later. The switch portion 840 includes: a rotation shaft 810 and the air path switch plate 820.

The rotation shaft 810 is disposed in an elongated shape on the first extension wall 410 and is located above the circulation air port 411. The air path switch plate 820, which will be described later, rotates around the rotation shaft 810.

The air path switch plate 820 has a V-shape formed by a first plate 821 and a second plate 822. An included angle between the first plate 821 and the second plate 822 is greater than 90 degrees and less than 180 degrees.

The specific structure of the improved air path switch unit of the heat exchange device according to the second embodiment of the present application is description above, and the operation of the air path switch unit will be described in detail below.

The air path switch unit for switching the circulation air port 411 and the exhaust air outlet 240 to an open state or a closed state is disposed in the exhaust outflow space 140. That is to say, when the heat exchange mode is activated, the air path switch plate 820 of the air path switch unit will cover the circulation air port 411 and open the exhaust air outlet 240. In this way, the air entering the exhaust outflow space 140 may only be discharged outdoor from the opened exhaust air outlet 240. When the internal circulation mode is activated, the air path switch plate 820 of the air path switch unit will cover the exhaust air outlet 240 and open the circulation air port 411, so that the air entering the exhaust outflow space 140 can only be discharged from the circulation air port 411 into the air-supply inflow space 110.

When the heat exchange mode is activated, the "V"-shaped air path switch plate 820 will cover the circulation air port 411. At this time, the second plate 822 will intersect a wall connecting the fan air outlet 505 of the exhaust air fan 510 with the circulation air port 411. Preferably, the second plate 822 is perpendicular to the wall connecting the fan air outlet 505 of the exhaust air fan 510 with the circulation air port 411. When air is blown from the exhaust air fan 510 to the exhaust vent port 340, a part of the air flowing through the air path switch plate 820 will form a thrust perpendicular to the second plate 822 to press the air path switch plate 820 toward the circulation air port 411, thereby improving the hermeticity. This prevents the air path switch plate 820 from vibrating and deterioration of the hermeticity which is caused by the entrance of air into the circulation air port 411 from a gap between the air path switch plates 820 since the straight-plate-shaped air path switch plate 820 in the related art is parallel to the direction of the air blowing from the exhaust air fan 510 to the exhaust air outlet 340.

When the internal circulation mode is activated, the "V"-shaped air path switch plate 820 will cover the exhaust air outlet 240. At this time, the air blown from the exhaust air fan 510 will first be blown to the air path switch plate 820 at the exhaust air outlet 240, and then redirected toward the circulation air port 411. The "V"-shaped air path switch plate 820 can make the air flowing through the surface of the air path switch plate 820 smoother, thereby reducing pressure loss and decreasing the power of the heat exchange device 10. This prevents the straight-plate-shaped air path switch plate in the related art, that is, an air path switch plate composed of a flat plate from being perpendicular to the first side wall 101 of the case 100, which causes the circulation air path 3000 at a right angle, resulting in increased pressure loss.

Finally, it should be noted that the above embodiments are only used to explain the technical solutions of the present application, and are not limited thereto; although the present application is described in detail with reference to the foregoing embodiments, it should be understood by those skilled in the art that they can still modify the technical solutions described in the foregoing embodiments and make equivalent substitutions to a part of the technical features; and these modifications and substitutions do not make the essence of the corresponding technical solutions deviate from the spirit and scope of the technical solutions of various embodiments of the present application.

The invention claimed is:

1. A heat exchange device, comprising:
a case, an interior of which is formed into an air-supply inflow space, an exhaust inflow space, an air-supply outflow space and an exhaust outflow space separated from each other, wherein a first extension wall is provided between the air-supply inflow space and the exhaust outflow space; and
a heat exchange unit disposed in the case, and the air-supply inflow space and the air-supply outflow space communicate with each other through the heat exchange unit to form an air-supply air path, and the exhaust inflow space and the exhaust outflow space communicate with each other through the heat exchange unit to form an exhaust air path, wherein the air-supply air path and the exhaust air path exchange heat when passing through the heat exchange unit,
wherein,
the first extension wall is provided with a circulation air port communicating the air-supply inflow space and the exhaust outflow space, wherein the circulation air port may be selectively opened and closed,
the case further comprises:
an air-supply air inlet configured to allow air in a first space to enter the case and communicate with the air-supply inflow space;

an air-supply air outlet configured to allow air entering the case to blow out toward a second space and communicate with the air-supply outflow space;

an air-supply air fan disposed in the air-supply outflow space and configured to guide the air from the air-supply air inlet into the case and blow toward the air-supply air outlet;

an exhaust air inlet configured to allow air in the second space to enter the case and communicate with the exhaust inflow space;

an exhaust air outlet configured to allow the air entering the case to blow out toward the first space and communicate with the exhaust outflow space; and an exhaust air fan disposed transversely in parallel with the air-supply air fan inside the exhaust outflow space and configured to guide the air from the exhaust air inlet into the case and blow toward the exhaust air outlet; and the heat exchange device further comprises:

a circulation air path formed by opening the circulation air port and closing the air-supply air inlet and the exhaust air outlet, wherein air blows from the exhaust air inlet to the air-supply air outlet through the circulation air port.

2. The heat exchange device of claim 1, wherein, the heat exchange device further comprises a circulation damper for selectively opening or closing the circulation air port.

3. The heat exchange device of claim 1, wherein, the heat exchange unit comprises a first heat exchange core and a second heat exchange core longitudinally stacked on the first heat exchange core.

4. The heat exchange device of claim 1, wherein, the heat exchange device further comprises an air path switch unit disposed on an upstream side of the circulation air port to selectively switch the circulation air port and an exhaust air outlet to an open state or a closed state, and the air path switch unit comprises:
an air path switch motor; and
a switch portion, which selectively switches the circulation air port and the exhaust air outlet to an open state or a closed state by rotation.

5. The heat exchange device of claim 4, wherein, the switch portion comprises:
a rotation shaft; and
an air path switch plate, including a first plate on a side close to the rotation shaft and a second plate on a side far away from the rotation shaft, and the first plate and the second plate form a V-shape.

6. The heat exchange device of claim 1, wherein, the heat exchange unit comprises: an air-supply suction port communicating with the air-supply inflow space; an air-supply vent port disposed opposite to the air-supply suction port and communicating with the air-supply outflow space; an exhaust suction port communicating with the exhaust inflow space; an exhaust vent port disposed opposite to the exhaust suction port and communicating with the exhaust outflow space; a first lateral edge formed by intersecting a plane where the air-supply suction port is located and a plane where the exhaust vent port is located; and a second lateral edge formed by intersecting a plane where the air-supply vent port is located and a plane where the exhaust suction port is located; a first side surface adjacent to the plane where the air-supply vent port is located and the plane where the exhaust vent port is located; and a second side surface adjacent to the plane where the air-supply suction port is located and the plane where the exhaust suction port is located.

7. The heat exchange device of claim 6, wherein, the air-supply air fan and the exhaust air fan are disposed in the lower part of the case.

8. The heat exchange device of claim 6, wherein, the heat exchange device further comprises a printed circuit board configured to control the air-supply air fan and/or the exhaust air fan, and a circuit board box configured to receive the printed circuit board, wherein the circuit board box is disposed on the lower part of the exhaust inflow space.

9. The heat exchange device of claim 6, wherein, the case comprises
a first side wall, a second side wall disposed opposite to the first side wall,
a front wall and a rear wall disposed between the first side wall and the second side wall and disposed opposite to each other,
wherein the first extension wall is formed by extending from the first lateral edge to the first side wall;
a second extension wall separating the exhaust inflow space and the air-supply outflow space is formed by extending from the second lateral edge to the second side wall; and
a third extension wall separating the exhaust outflow space and the air-supply outflow space is formed by extending from the first side surface to the rear wall.

10. The heat exchange device of claim 9, wherein, the heat exchange device further comprises:
a circulation guide portion disposed on a downstream side of the circulation air port, and guiding air from the circulation air port to blow toward the air-supply suction port of the heat exchange unit.

11. The heat exchange device of claim 10, wherein, the circulation guide portion comprises:
a circulation guide side surface extending from the first extension wall toward an air-supply inflow space side and toward the air-supply suction port side of the heat exchange unit;
a circulation guide top surface extending from an upper edge of the circulation guide side surface toward the first extension wall; and
a circulation guide bottom surface extending from a lower edge of the circulation guide side surface toward the first extension wall,
wherein the circulation guide top surface, the circulation guide side surface and the circulation guide bottom surface form a circulation guide air outlet opposite to the air-supply suction port.

12. The heat exchange device of claim 11, wherein, the circulation guide top surface comprises an inclined surface inclined from the first extension wall toward the front wall of the case and toward the lower part of the case.

13. The heat exchange device of claim 9, wherein, a distance between the first lateral edge and the first side wall is greater than a distance between the second lateral edge and the second side wall.

14. The heat exchange device of claim 13, wherein, the heat exchange device further comprises:
a circulation guide portion disposed on a downstream side of the circulation air port, and guiding air from the circulation air port to blow toward the air-supply suction port of the heat exchange unit.

15. The heat exchange device of claim 13, wherein,
a heat exchange center line passing through the centers of the first side surface and the second side surface is biased from the third extension wall, and at least a part of the first side surface overlaps the air-supply air fan in the front-to-rear direction.

16. The heat exchange device of claim 15, wherein,
the heat exchange device further comprises:
a circulation guide portion disposed on a downstream side of the circulation air port, and guiding air from the circulation air port to blow toward the air-supply suction port of the heat exchange unit.

17. The heat exchange device of claim 15, wherein, a side where a motor of the air-supply air fan is located and a side where a motor of the exhaust air fan is located are disposed opposite to each other.

18. The heat exchange device of claim 17, wherein,
the heat exchange device further comprises:
a circulation guide portion disposed on a downstream side of the circulation air port, and guiding air from the circulation air port to blow toward the air-supply suction port of the heat exchange unit.

19. The heat exchange device of claim 17, wherein,
the side where the motor of the air supply fan is located faces a side where the heat exchange unit is located.

20. The heat exchange device of claim 19, wherein,
the heat exchange device further comprises:
a circulation guide portion disposed on a downstream side of the circulation air port, and guiding air from the circulation air port to blow toward the air-supply suction port of the heat exchange unit.

\* \* \* \* \*